United States Patent [19]

Begrich

[11] 4,079,051

[45] Mar. 14, 1978

[54] 4-HALOGENO-S-TRIAZIN-2-YL-PHOSPHORAMIDE ACID CONTAINING REACTIVE DYESTUFFS

[75] Inventor: Rainer Begrich, Basel, Switzerland

[73] Assignee: Ciba-Geigy Corporation, Ardsley, N.Y.

[21] Appl. No.: 640,135

[22] Filed: Dec. 12, 1975

Related U.S. Application Data

[63] Continuation of Ser. No. 375,406, Jul. 2, 1973, abandoned.

[30] Foreign Application Priority Data

Jun. 14, 1973 Switzerland ............... 8610/73

[51] Int. Cl.² ............... C09B 62/08; C09B 62/04
[52] U.S. Cl. ............... 260/153; 260/146 T; 260/147; 260/148; 260/149; 260/150; 260/151; 260/158; 260/160; 260/161; 260/162; 260/163; 260/176; 260/182; 260/184; 260/185; 260/186; 260/187; 260/189; 260/190; 260/191; 260/193; 260/194; 260/198; 260/199; 260/205; 260/207.1; 260/242.2; 544/181; 544/187; 544/189; 544/195
[58] Field of Search ............... 260/153, 146 T, 147

[56] References Cited

U.S. PATENT DOCUMENTS

| 3,057,846 | 10/1962 | Andrew et al. ............... 260/146 T |
| 3,354,140 | 11/1967 | Benz et al. ............... 260/146 T |
| 3,462,410 | 8/1969 | Schneider ............... 260/153 |
| 3,527,746 | 9/1970 | Canonica et al. ............... 260/153 |
| 3,544,546 | 12/1970 | Crabtree et al. ............... 260/145 B |

FOREIGN PATENT DOCUMENTS

| 275,122 | 10/1963 | Australia ............... 260/153 |
| 970,585 | 9/1964 | United Kingdom ............... 260/146 T |

*Primary Examiner*—Charles F. Warren
*Attorney, Agent, or Firm*—Edward McC. Roberts; Michael W. Glynn; Prabodh I. Almaula

[57] ABSTRACT

Reactive dyestuffs of the formula

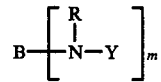

wherein

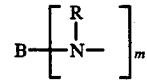

is an amino-substituted azo dyestuff radical where
B is the azo dyestuff radical thereof;
R is hydrogen or lower alkyl which is unsubstituted or substituted by methoxy, ethoxy or hydroxy;
m is 1–2;

and wherein Y is

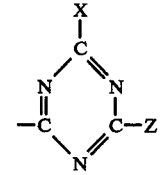

where
X is chloro, bromo or fluoro;
Z is

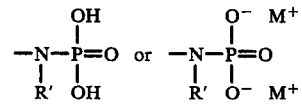

where
each M+ is alkali metal or ammonium, or both M+ together represent magnesium, calcium or zinc; and
R' is hydrogen, lower alkyl or lower alkyl substituted by methoxy, ethoxy or hydroxy. These dyestuffs are useful in dyeing textile materials of cotton, regenerated cellulose, wool, silk, cellulose acetate, polyamides, polyacrylonitrile and modified polyacrylonitrile.

3 Claims, No Drawings

4-HALOGENO-S-TRIAZIN-2-YL-PHOSPHORA-MIDE ACID CONTAINING REACTIVE DYESTUFFS

This is a continuation of application of Ser. No. 375,406 filed July 2, 1973, and now abandoned.

The present application relates to new reactive dyestuffs which contain at least one group of the formula

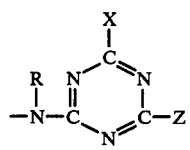
(1)

wherein R denotes a hydrogen atom or an alkyl radical, X denotes chlorine, bromine or fluorine and Z is a radical of the formula

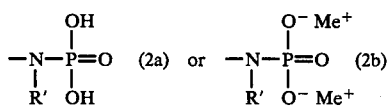

wherein $Me^{3\oplus}$ is a cation and R' is a hydrogen atom or an alkyl radical. Possible cations are above all those of the alkali metals, such as $Li^+$, $K^+$ and especially $Na^+$, as well as $NH_4^+$. Instead of two monovalent cations, the product can also contain one divalent metal ion, for example $Mg^{2+}$, $Ca^{2+}$ or $Zn^{2+}$.

As examples of the substituted or unsubstituted alkyl radicals defined by R and R' there may be mentioned: low molecular alkyl radicals, such as methyl, ethyl, propyl and butyl, which can contain substituents, such as methoxy, ethoxy and hydroxyl groups.

Each of the groups of the formula (1) is bonded to a carbon atom present in the dyestuff. This carbon atom can be a member of an aryl nucleus present in the dyestuff or a member of an alkyl chain which is bonded directly to an aryl radical present in the dyestuff or is bonded to an aryl radical via a bridge atom or a bridge group. As examples of such bridging atoms or goups there may be mentioned: —O—, —S—, —CO—, —SO₂—, —NH—, —N—aklyl, —CONH—, —SO₂NH— and —SO₂—N—alkyl.

The dyestuffs according to the invention can belong to any known class of dyestuffs and preferably belong to the monoazo or polyazo series or to the nitro, anthraquinone, formazone or phthalocyanine series. Preferably, they contain at least one group which confers solubility in water, for example a carboxylic acid group or especially a sulphonic acid group. It is also possible to use metal complex dyestuffs, above all copper, chromium or cobalt complexes.

The new reactive dyestuffs are appropriately manufactured by reacting a dyestuff which contains at least one group of the formula

—NH—R (3)

wherein R has the abovementioned meaning, with a compound of the formula

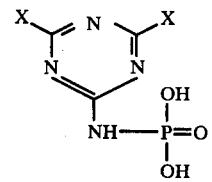
(4)

wherein X is chlorine, bromine or fluorine, or with salts of this acid.

The condensation is carried out in a manner which is in itself known. Advantageously, this is done in the presence of acid-binding agents such as sodium carbonate, sodium bicarbonate or sodium acetate, in a pH range of 2 to 7.5 and under such conditions that in each case only one halogen atom is replaced, so that the finished dyestuff molecule still contains a halogen atom which can react with the substrate which is to be dyed. The pH range can also be maintained by gradual addition of sodium hydroxide solution. Appropriately, the dyestuff compound containing amino groups is taken as a solution or suspension in water or in a water-miscible solvent, such as dioxane, and a neutral, aqueous solution of (4,6-dihalogeno-s-triazin-2-yl)-phosphoramide-acid is added to this mixture. Both reactants can be dissolved or suspended in mixtures of water and water-miscible organic solvents, such as acetone, dioxane, tetrahydrofurane or glycol ethers.

After completion of the condensation, the dyestuff which has precipitated is filtered off. If necessary, sodium chloride or potassium chloride can be added in order to ensure the complete precipitation of the dyestuff. Instead of precipitating the dyestuff with sodium chloride, it is also possible, after completion of the condensation, to evaporate the solution in vacuo or to spray-dry it.

If desired, the new dyestuffs can be isolated from the medium in which they have been formed, in the presence of a buffer and/or be dried subsequently. As examples of buffers which can be used for this purpose there may be mentioned: buffers derived from phosphates, such as sodium dihydrogen phosphate and disodium hydrogen phosphate, citrates, such as sodium citrate, borates and alkali metal salts dialkylmetanilic acid, such as sodium diethylmetanilate, which are preferably used in conjunction with sodium hydrogen phosphate.

According to the invention, a modified process for the manufacture of the new dyestuffs is furthermore claimed, which is applicable to the manufacture of azo dyestuffs. This consists of coupling a diazotisable primary aromatic amine with a coupling component, it being necessary for the primary aromatic amine and the coupling component together to contain at least one group of the formula (1).

This modified process according to the invention can appropriately be carried out by adding sodium nitrite to a solution or suspension of the primary amine, which can be an aminoazo compound, in a dilute aqueous hydrochloric acid solution, adding the diazo solution or suspension, thus obtained to an aqueous solution of the coupling component and filtering off the dyestuff which has separated out. If necessary, sodium chloride can be added in order to ensure the complete precipitation of the entire azo dyestuff.

Those primary amines and coupling components which contain at last one group of the formula (1) can be obtained by condensation of the corresponding primary amine or of the corresponding coupling component, which contains at least one group of the formula (3), with (4,6-dihalogeno-s-triazin-2-yl)-phosphoramide-acid or its salts.

G. I. Derkach et al. have described, in Khim. Org. Soedin. Fosfora, Akad. Nauk SSSR, Otd. Obshch. Tekh. Khim 1967, 89–93, a manufacturing process for the compounds of the formula (4) required as intermediate products, especially (4,6-dichloro-s-triazin-2-yl)-phosphoramide-acid. According to this, (4,6-dichloro-s-triazin-2-yl)-phosphoramide-acid is manufactured from (4,6-dichloro-s-triazin-2-yl)-phosphorimide-trichloride by treatment with 100% strength formic acid in dry ethylene chloride. This formolysis requires heating the reaction mixture for 14 to 15 hours.

It has now been found, surprisingly, that the phosphormaide-acid of the formula (1) can also be obtained by hydrolysis in an aqueous medium in the presence of an acid-binding agent. This new process has the advantage that the reaction temperaturwe takes place so rapidly, even at room temperature, that it is complete in less than 1 hour. Furthermore, the aqueous solution obtained from the hydrolysis, which contains a salt of the phosphoramide-acid, can be used directly for the reaction with dyestuffs containing amino groups or dyestuff intermediate products. On the other hand, in the procedure according to the known process, isolation would generally be necessary.

The new process for the manufacture of compounds of the formula (4) is hence characterised in that a compound of the formula

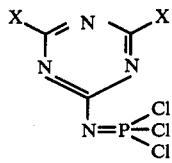

(5)

wherein X has the indicated meaning, is hydrolysed in an aqueous medium in the presence of an acid-binding agent.

The hydrolysis is appropriately carried out at a pH value of 4 to 10, preferably of 7 to 8. This range can most advantageously be obtained with a phosphate buffer. In order to keep the pH value constant, a base, preferably aqueous sodium hydroxide solution, is added during the reaction. The medium in which the hydrolysis is carried out can be purely aqueous or can be a mixture of water with an organic solvent which is miscible with water and inert towards the PCl$_3$ group, for example dioxane, tetrahydrofurane, acetone or a glycol ether.

The reaction temperature can lie in the range of about 0° to 50° C. However, the reaction is preferably carried out at room temperature or below.

(4,6-Dihalogeno-s-triazin-2-yl)-phosphorimide-trichloride can be obtained from 4,6-dihalogeno-2-amino-s-triazine by reaction with phosphorus pentachloride. This reaction is appropriately carried out in an inert solvent such as dioxane. The resulting phosphorimide-trichloride does not have to be isolated and instead the solution obtained can be employed directly for the hydrolysis. (4,6-Dichloro-s-triazin-2-yl)-phosphorimide-trichloride is the most easily accessible.

The dyestuff compounds of the azo series used as starting products, which contain at least one —NHR group, can be obtained according to various processes. One process consists of diazotising an aromatic primary amine and to couple the diazonium compound thus obtained with a coupling component containing a —NHR group. As examples of aromatic primary amines which can be used in this way in order to obtain aminoazo compounds, there may be mentioned: aniline, o-, m- and p-toluidines, o-, m- and p-anisidines, o-, m- and p-chloroanilines, 2,5-dichloroaniline, α- and β-naphthylamine 2,5-dimethylaniline, 5-nitro-2-aminoanisole, 4-aminodiphenyl, aniline-2,3- and -4-carboxylic acids, 2-aminodiphenyl-ether, 2-, 3- or 4-aminobenzenesulphonamide or -sulphomonomethylamides or -sulphomonoethylamides or -sulpho dimethylamides or sulpho diethylamides, dehydrothio-p-toluidinemonosulphonic acid or dehydrothio-p-toluidinedisulphonic acid, aniline-2-, -3- and -4-sulphonic acids, aniline-2,5-disulphonic acid, 2,4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylamino-aniline-6sulphonic acid, 4-acetylaminoaniline-2-sulphonic acid, 4-chloroaniline-2-sulphonic acid, 3,4-dochloroaniline-6-sulphonic acid, 4-methylaniline-2-sulphonic acid, 3-methylaniline-6-sulphonic acid, 2,4-dimethoxyaniline-6-sulphonic acid, 4-methoxyaniline-2-sulphonic acid and 5-methoxyaniline-2-sulphonic acid, 2,5-dichloroaniline-4-sulphonic acid, 2-naphthylamine-4,8- and -6,8-disulphonic acid, 1-naphthylamine-2-, -4-, -5-, -6- or -7-monosulphonic acid, 1-naphthylamine-3,6-disulphonic acid, 2-naphthylamine-3,6 - and -5,7-disulphonic acid, 2-naphthylamine-3,6,8-trisulphonic acid, m- and p-nitroaniline, 4-nitroaniline-2-sulphonic acid, 3-nitroaniline-6-sulphonic acid, m- or p-aminoacetanilide and 4-amino-2-acetylaminotoluene-5-sulphonic acid.

As examples of coupling components which can be used there may be mentioned: 2-amino- and 2-methylamino-5-naphthol-7-sulphonic acid, 2-amino- and 2-methylamino-8-naphthol-7-sulphonic acid, 1-amino- and 1-ethylamino-8-naphthol-6-sulphonic acid and corresponding 3,6- and 4,6-disulphonic acids, 1-(3'- or 4'-aminobenzoylamino)-8-naphthol-3,6- and -4,6-disulphonic acid, aniline, o- and m-anisidine, o- and m-toluidine, 2,5-dimethylaniline, 3-aminomethoxytoluene, 2,5dimethoxyaniline, N-methylaniline, N-ethyl-o-toluidine, N-methyl-m-anisidine, 3-methylamino-4-methoxytoluene, 1-(3'-aminophenyl)-3-methyl-, -carboxy- and -carbethoxy-5-pyrazolone, 1-(4'-aminophenyl)-3-methyl-, -carboxy- and -carbethoxy-5-pyrazolone and 1-(4'-amino-3'-carboxyphenyl)-3-methyl-5-pyrazolone and 1-ethyl-3-sulphomethyl-4-methyl-5-carbamyl-6-hydroxy-pyridone-2.

The aminoazo compounds to be used in the process according to the invention are not restricted to compounds containing only one azo group. Disazo compounds can be obtained, for example, by tetrazotisation of an aromatic diamine containing two primary amino groups and coupling of the tetrazo compound thus obtained with 2 molar proportions of one of the coupling components defined above or with 1 molar proportion of each of two of the coupling components defined above or with 1 molar proportion of one of the coupling components defined above and 1 molar proportion of a coupling component not containing any amino group. As examples of such aromatic diamines there may be mentioned: benzidine, 3,3'-dimethoxybenzidine, benzidine-2,2'-disulphonic acid, benzidine-3,3'dicarboxylic acid, benzidine-3,3'-diglycolic acid and 4,4'-diaminostilbene-2,2'-disulphonic acid. Furthermore disazo or polyazo compounds can be obtained by using primary aromatic amines or diamines containing azo groups. As examples of primary aromatic amines or diamines containing such azo groups there may be mentioned: 4-aminoazobenzene-4'-sulphonic acid, 4'-amino-2'-methylphenylazo-2-naphthalene-4,8-disulphonic acid and 4-amino-5-methoxy-2-methyl-4'-nitro-2'-sulphoazobenzene.

Instead of starting from amines free of —NHR groups it is also possible to couple a coupling component which optionally contains a —NHR group with a diazonium compound containing a —NHR group. Such diazonium compounds can be obtained according to known processes by diazotisation of primary aromatic amines which contain a second amino group or a monosubstituted amino group. As examples of such primary aromatic amines there may be mentioned: p-phenylenediamine, 1,4-phenylenediamine-2-sulphonic acid, 1,4-phenylenediamine-2-carboxylic acid and 1,4-diaminonaphthalene-2-sulphonic acid. As examples of coupling components which can be used in this manner there may be mentioned the coupling components listed above and also β-naphthol, 2-naphthol-6- or -7-sulphonic acid, 2-naphthol-3,6- or -6,8-disulphonic acid, 1-naphthol-4-sulphonic acid, 1-phenyl-3-methyl-5-pyrazolone, 1-(4'-sulphophenyl)-3-methyl-5pyrazolone, 1-(2', 5'-dichloro-4'-sulphophenyl)-3-methyl-5-pyrazolone, 2-benzoylamino-5-naphthol-7-sulphonic acid, 1-benzoylamino-8-naphthol-3,6- or -4,6-disulphonic acid, phenol, p-cresol, acetoacetanilide and acetoacet-2-methoxyaniline-5-sulphonic acid.

Further processes for the manufacture of the dyestuff compounds of the azo series which contain a —NHR group and which can be used in the process according to the invention consist of reducing a dyestaff containing nitro groups or treating an azo or polyazo compound, which contains at least one acylamino group, with aqueous acid or aqueous alkali in order to hydrolyse off the acylamino group or groups. Such azo or polyazo compounds can be obtained from primary aromatic amines and/or coupling components which contain acyl-amino groups. As examples of such primary aromatic amines there may be mentioned: monoacetylbenzidine, 4-amino-1-acetyl-aminonaphthalene-6-sulphonic acid, 4-amino-4'-acetylamino-diphenyl-3-sulphonic acid, 4-amino-3-sulphoacetanilide, 3-amino-4-sulphoacetanilide and 4-amino-4'-acetylaminostilbene-2,2'-disulphonic acid, whilst as examples of such coupling components there may be mentioned: 2-acetylamino-5-sulphonaphthol-7-sulphonic acid, 2-N-acetyl-N-methylamino-5-naphthol-7-sulphonic acid, 2-acetylamino- and 2-N-acetyl-N-methylamino-8-naphthol-6-sulphonic acids and 1-acetylamino-8-naphthol-3,6- and -4,6-disulphonic acids.

As examples of dyestuff compounds of the anthraquinone series which can be used as starting products in the process according to the invention, there may be mentioned: anthraquinone compounds which contain a group of the formula —NHR, defined above, bonded to an alkylamino or arylamino group which is itself bonded to the α-position of the anthraquinone nucleus. As examples of such anthraquinone compounds there may be mentioned: 1-amino-4-(4'-aminoaniline)-anthraquinone-2,3'-disulphonic acid and the corresponding 2,3',5-and 2,3',6-trisulphonic acids, 1-amino-4-(4"-amino-4'-benzoylaminoaniline)-anthraquinone-2,3-disulphonic acid and the corresponding -2,3',5-trisulphonic acid, 1-amino-4-(4'-(4"-aminophenylazo)-anilino)-anthraquinone-2,2",5-trisulphonic acid, 1-amino-4-(4'-amino-3'-carboxyanilino)-anthraquinone-2,5-disulphonic acid, 1-amino-4-(3'-aminoaniline)-anthraquinone-2,4',5-trisulphonic acid and the corresponding 2,4-disulphonic acid, 1-amino-4-(4'-(4"-aminophenyl)-anilino)-anthraquinone-2,3",5-trisulphonic acid, 1-amino-4-(4'-methylamino)-anilinoanthraquinone-2,3'-disulphonic acid and the corresponding 2,3',5-trisulphonic acid, 1-amino-4-(4'-n-butylamino)-anilinoanthraquinone-2,3'-disulphonic acid, 1-amino-4-(4'-methylamino-3'-carboxyanilino)-anthraquinone-2-sulphonic acid, 1-amino-4-(3'-β-hydroxyethylamino)-anilinoanthraquinone-2,5-disulphonic acid, 1-(4'-aminoanilino)-anthraquinone-2,3'-disulphonic acid and 1-amino-4-(4'-amino-2'-methoxyanilino)-anthraquinone-2,3'-disulphonic acid.

Such dyestuff compounds of the anthraquinone series can themselves be obtained from anthraquinone compounds which contain a halogen atom or a nitro group bonded to the corresponding α-position of the anthraquinone nucleus, or from the leuco-derivative of a 1,4-dihydroxyl-, -diamino- or -aminohydroxyanthraquinone by reaction of the appropriate anthraquinone compound with at least one molar proportion of an aliphatic or aromatic diamine.

Dyestuff compounds of the phthalocyanine series which can be used in the process according to the invention, are preferably metallised phthalocyanines, such as copper phthalocyanines, which contain at least one group which conferes solubility in water, such as a sulphonic acid group, and at least one group of the formula —NHR, as defined above.

The —NHR group or groups can be bonded directly or via a divalent bridge to the benzene rings of the phthalocyanine nucleus, for example via a -phenylene-, —CO— phenylene-, —SO₂—phenylene-, —NH—phenylene-, —S—phenylene-, —O-phenylene-, —CH₂S-phenylene-, —CH₂O—phenylene-, —CH₂—phenylene-, —SCH₂—phenylene-, —SO₂CH₂—phenylene-, —SO₂NR₁—phenylene-, —CH₂—, —SO₂NR₁—arylene-, —NR₁CO—phenylene-, —NR₁SO₂—phenylene-, —SO₂O—phenylene-, —CH₂—, —CH₂NR₁—phenylene-, —CH₂NH—CO—phenylene-, —SO₂NR₁—alkylene-, —CH₂NR₁-alkylene-, —CONR₁—phenylene-, —CH₂—, —CONR₁—arylene-, —SO₂ or a —CO—bridge. In the abovementioned divalent bridge members, R₁denotes hydrogen, alkyl or cycloalkyl, arylene denotes a divalent aromatic radical which is optionally substituted, for example by halogen, alkyl or alkoxy, and wherein the terminal bonds can be bonded to identical or different nuclei, and alkylene denotes a divalent aliphatic radical which can include hetero-atoms, such as nitrogen, in the atomic chain, for example the —CH₂CH₂—NH—CH₂CH₂— radical.

As examples of such divalent aromatic radicals which are designated arylene, there may be mentioned: aromatic nuclei, for example a benzene, naphthalene, acridine and carbazole nucleus, which can carry further substituents, and radicals of the formula

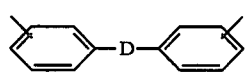

(6)

wherein the benzene rings can carry further substituents and —D— denotes a bridging group, for example —CH=CH—, —NH—, —S—, —O—, —SO$_2$—, —NO=N—, —N=N—, —NH—CO—NH—, CO—NH—, —O—CH$_2$CH$_2$O— or

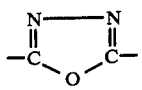 (7)

As particular examples of dyestuff compounds of the phthalocyanine series which can be used in the process according to the invention, there may be mentioned: copper phthalocyanine-4-N-(4-amino-3-sulphophenyl)-sulphonamide-4′4′′,4′′′-trisulphonic acid, cobalt phthalocyanine-4,4′-di-N-(4′amino-4′-sulphophenyl)-carbonamide-4′′,4′′′-dicarboxylic acid and copper 4-(4′-amino-3′-sulphobenzoyl)-phthalocyanine.

It is also possible to use mixtures of aminophthalocyanines. For example, a mixture of approximately equal parts of copper phthalocyanine-N-(4-amino-3-sulphophenyl)-sulphonamide-trisulphonic acid and copper phthalocyanine-di-N-(4-amino-3-sulphophenyl)-sulphonamide-disulphonic acid can be used.

The aminophthalocyanines containing a sulphonic acid can be obtained either by sulphonation of known phthalocyanines containing primary or secondary amino groups or by synthesis from mixtures of phthalic acid derivatives and sulphonated phthalic acid derivatives. Sulphonating agents used are, for example, oleum, for example a 20% strength solution of sulphur trioxide in sulphuric acid.

They can furthermore be obtained by conjointly warming suitable derivatives of sulphonated phthalic acid and substituted phthalic acids in accordance with the generally known processes, for example by conjointly warming a mixture of 4-sulphophthalic anhydride and 4-p-nitrobenzoylphthalic anhydride, urea, copper (II) chloride and ammonium molybdate in o-dichlorobenzene at about 150° C. It is also possible to manufacture phthalocyanines, which are used as the starting product, by sulphonation of the appropriate primary and secondary amines or by reaction of a primary (or secondary N-alkyl- or cycloalkyl-) nitroaniline with a phthalocyanine which contains chloromethyl groups and sulphonic acid or carboxylic acid groups. Furthermore, such aminophthalocyanines can also be manufactured by reaction of a phthalocyanine, which contains chlorosulphonyl groups, with a monoacetylalkylenediamine or an amino-N-benzylacetamide in the presence of water and treatment of the product thus obtained (which contains both sulphonamide groups and sulphonic acid groups) with aqueous alkali to hydrolyse the acetylamino group, or by reaction of a phthalocyanine which contains chloromethyl groups and sulphonic acid or carboxylic acid groups, with a monoacetylalkylenediamine, and treatment of the product thus obtained with aqueous alkali to hydrolyse the acetylamino groups. Furthermore, they can be obtained by direct sulphonation or by conjointly warming a mixture of suitable carboxy- or sulphophthalic acid derivatives with substituted phthalic acid derivatives, for example by warming the anhydrides with urea and a catalyst, in an organic solvent, and reduction of the nitrophthalocyaninesulphonic acid or -carboxylic acid thus obtained, or hydrolysis of the acylaminephthalocyanine-sulphonic acid or -carboxylic acid, or by reaction of a phthalocyanine compound which contains carboxylic acid chloride groups, with a diaminobenzenesulphonic acid or -carboxylic acid, an aminobenzenesulphonic acid or an aminobenzoic acid, which also contains a nitro group, and reduction of the nitro compound thus obtained, or, finally, by reaction of a phthalocyanine compound which contains carboxylic acid chloride groups, with a N-aminobenzylacetamide, and subsequent hydrolysis of the product thus obtained with aqueous alkali.

Dyestuff compounds of the nitro series which can be used in the process according to the invention are preferably those of the formula

 (8)

wherein D' denotes a naphthalene or benzene nucleus which can be substituted further, the nitrogen atom N is in the ortho-position to the nitro group, Z' denotes hydrogen or an optionally substituted hydrocarbon radical and Q denotes hydrogen or an organic radical bonded to the nitrogen via a carbon atom, and Q and Z' are not both hydrogen, and Q can be bonded to Z', if Z' is a hydrocarbon radical, or to D' in the ortho-position to the nitrogen atom N to form a heterocyclic ring, and which contain at least one group of the formula —NHR, as defined above.

Dyestuff compounds of the formazane series, which can be used according to the invention, are the metal complexes of formazanes of the formula

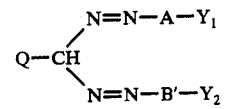

which contain at least one radical of the formula —NHR. Q here denotes a monovalent radical, for example an aromatic or heterocyclic radical, an alkyl, nitro, nitrile, low molecular alkanoyl or benzoyl radical or a low molecular carbalkoxy group, that is to say a carbalkoxy group containing 1-4 C atoms. A and B' are radicals of diazo components and Y$_1$ and Y$_2$ denote substituents which are capable of complex formation with a heavy metal atom. A, B' and Q can be substituted by sulpho groups.

The dyestuff molecule should in total contain 1 to 5 sulpho groups.

As particular examples of dyestuff compounds containing at least one —NHR group, which can be used as starting products in the process according to the invention, the compounds of the following classes may be mentioned:

1. Azo compounds of the formula

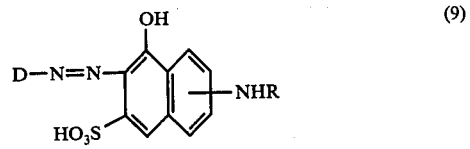 (9)

wherein D denotes an at most bicyclic aryl radical which is free of —NHR groups and the —NHR group is preferably bonded to the 6-, 7- or 8-position of the naphthalene nucleus, and which optionally contain a further sulphonic acid group in the 5- or 6-position of the naphthalene nucleus.

D can denote a radical of the naphthalene or benzene series, for example a stilbene, diphenyl, benzthiazolylphenyl or diphenylamine radical. Within this class, the related dyestuffs in which the —NHR group, instead of being bonded to the naphthalene nucleus, is bonded to a benzoylamino or anilino group bonded to the 6-, 7- or 8-position of the naphthalene nucleus, should also be borne in mind.

Particularly valuable starting dyestuffs are those wherein D denotes a sulphonated phenyl or naphthyl radical, especially those which contain a —SO₃H group in the orthoposition to the azo bond; the phenyl radical can be substituted further, for example by halogen atoms, such as chlorine, low molecular alkyl radicals, such as methyl, alkylcarbonylamino or alkoxycarbonylamino groups such acetylamino, methoxycarbonylamino or ethoxycarbonylamino, ureido radicals and alkoxy radicals, such as methoxy.

D can furthermore denote a radical of the azobenzene, azonaphthalene or phenylazonaphthalene series.

2. Azo compounds of the formula

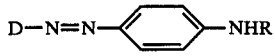  (10)

wherein D denotes an at most bicyclic aryl radical, such as described in Class 1, and preferably a disulphonaphthyl or stilbene radical, and the benzene nucleus of the coupling component can contain further substituents, such as halogen atoms or low molecular alkyl, alkoxy, alkylcarbonylamino, alkoxycarbonylamino or ureidyl groups, that is to say such groups containing 1 to 4 C atoms.

3. Azo compounds of the formula

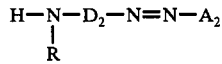  (11)

wherein $D_2$ denotes an arylene radical, such as a radical of the azobenzene, azonaphthalene or phenylazonaphthalene series, or preferably an at most bicyclic arylene radical of the benzene or naphthalene series, and $A_2$ denotes the radical of a naphtholsulphonic acid or the radical of an enolised or enolisable ketomethylene compound (such as an acetoacetarylide or a 5-pyrazolone) with the OH group in the ortho-position to the azo group. $D_2$ preferably denotes a radical of the benzene series which contains a sulphonic acid group.

4. Azo compounds of the formula

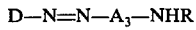  (12)

wherein D denotes a radical of the types defined for D in Class 1 above and $A_3$ denotes the radical of an enolisable ketomethylene compound (such as an acetoacetarylide or a 5-pyrazolone) with the OH group in the ortho-position to the azo group.

5. The metal complex compounds, for example the copper, chromium and cobalt complexes, of the dyestuffs of the formulae (9), (11) and (12), wherein D, $D_2$, A, $A_2$ and $A_3$ have the particular meanings indicated and additionally a metallisable group (for example a hydroxyl, lower alkoxy or carboxylic acid group) is present in the ortho-position to the azo group in D or $D_2$.

6. Anthraquinone compounds of the formula

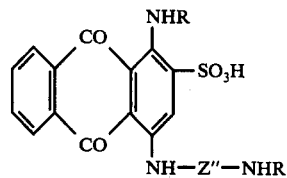  (13)

wherein the anthraquinone nucleus can contain an additional sulphonic acid group in the 5-, 6-, 7- or 8-position and $Z''$ denotes a bridge member which is preferably a divalent radical of the benzene series, for example a phenylene, mesitylene, diphenylene or 4,4'-stilbene or -azobenzene radical. Preferably, $Z''$ should contain a sulphonic acid group for each benzene ring present.

7. Phthalocyanine compounds of the formula

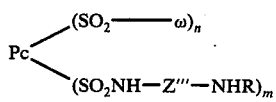  (14)

wherein Pc denotes a phthalocyanine nucleus, preferably copper phthalocyanine, ω denotes —OH and/or —NH₂, $Z'''$ denotes a bridge member, preferably an aliphatic cycloaliphatic or aromatic bridge, and n and m each denote 1, 2 or 3 and can be identical or different, provided $n+m$ is not greater than 4.

8. Nitro dyestuffs of the formula

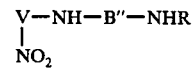

wherein V and B' denote monocyclic aryl nuclei and the nitro group in V is in the ortho-position to the NH group.

9. Metal complexes of formazane dyestuffs of the formula

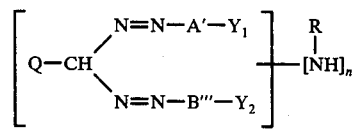

wherein Q is an organic radical, a nitro group or a nitrile group, A' and B''' denote radicals of diazo components of the benzene, naphthalene or heterocyclic series and $Y_1$ and $Y_2$ each denote a substituent bonded in the o-position to the azo group and capable of complex formation with a heavy metal, and R has the indicated meaning. The radical Q is above all a radical of the benzene series, such as phenyl or sulphophenyl, or a low molecular alkyl radical, such as methyl, and A' and B''' are preferably phenyl radicals substituted by sulpho, sulphonamido or alkylsulphonyl groups. Possible substituents $Y_1$ and $Y_2$ are above all the hydroxyl and carboxyl groups. Suitable heavy metals are copper, chromium, cobalt and nickel.

Possible starting dyestuffs in the dyestuff classes mentioned are, for example, the following:

In Class 1: 6-amino-1-hydroxy-2-(2'-sulphophenylazo)naphthalene-3-sulphonic acid, 6-methylamino-1-hydroxy-2-(4'-acetylamino-2'-sulphophenylazo)-naphthalene-3-sulphonic acid, 8-amino-1- hydroxy-2-(2'-sulphophenylazo)-naphthalene-3,6-disulphonic acid, 8-amino-1-hydroxy-2-(4'-chloro-2'-sulphophenylazo)-naphthalene-3,5-disulphonic acid, 7-amino-2-(2',5'-disulphophenylazo)-1-hydroxynaphthalene-3-sulphonic acid, 7-methylamino-2-(2'-sulphophenylazo)-1-hydroxynaphthalene-3-sulphonic acid, 7-methylamino-2-(4'-methoxy-2'-sulphophenylazo)-1-hydroxynaphthalene-3-sulphonic acid, 8-(3''-aminobenzoylamino)-1-hydroxy-2-(2'-sulphophenylazo)-naphthalene-3,6-disulphonic acid 8-amino-1-hydroxy-2,2'-azonaphthalene-1',3', 5',6-tetrasulphonic acid, 8-amino-1-hydroxy-2,2'-azonaphthalene-1',3,5'-trisulphonic acid, 6-amino-1-hydroxy-2,2'-azonaphthalene-1',3,5'-trisulphonic acid, 6-methylamino-1-hydroxy-2,2'-azonaphthalene-1',3,5'-trisulphonic acid, 7-amino-1-hydroxy-2,2'-azonaphthalene-1',3-disulphonic acid, 8-amino-1-hydroxy-2-(4'-hydroxy-3'-carboxyphenylazo)-naphthalene-3,6-disulphonic acid, 6-amino-1-hydroxy-2-(4'-hydroxy-3'-carboxyphenylazo)naphthalene-3,5-disulphonic acid, 8-amino-1-hydroxy-2-(4'-(2''-sulphophenylazo)-2'-methoxy-5'-methylphenylazo)-naphthalene-3,6-disulphonic acid, 8-amino-1-hydroxy-2-(4'-(4''-methoxyphenylazo)-2'-carboxyphenylazo)-naphthalene-3,6-disulphonic acid, 8-amino-1-hydroxy-2-(4'-(2''-hydroxy-3'',6''-disulpho-1''-naphthylazo)-2'-carboxyphenylazo)-naphthalene-3,6-disulphonic acid, 4,4'-bis-(8''-amino-1''-hydroxy-3'',6''-disulpho-2''-naphthylazo)-3,3'-dimethoxydiphenyl and 6-amino-1-hydroxy-2-(4'-(2''-sulphophenylazo)-2'-methoxy-5'-methylphenylazo)-naphthalene-3,5-disulphonic acid.

In Class 2: 2-(4'-amino-2'-methylphenylazo)-naphthalene-4,8-disulphonic acid, 2-(4'-amino-2'-acetylaminophenylazo)naphthalene-5,7-disulphonic acid, 4-nitro-4'-(4''-methylaminophenylazo)-stilbene-2,2'-disulphonic acid, 4-nitro-4'-(4''-amino-2''-methyl-5''-methoxyphenylazo)-stilbene-2,2'-disulphonic acid, 4-amino-4'-(4''-methoxyphenylazo)-stilbene-2,2'-disulphonic acid and 4-amino-2-methylazobenzene-2',5'-disulphonic acid.

In Class 3: 1-(2',5'-dichloro-4'-sulphophenyl)-3-methyl-4-(3''-amino-4''-sulphophenylazo)-5-pyrazolone, 1-(4'-sulphophenyl)-3-carboxy-4-(4''-amino-3''-sulphophenylazo)-5-pyrazolone, 1-(2'-methyl-5'-sulphophenyl)-3-methyl-4-(4''-amino-3''-sulphophenylazo)-5-pyrazolone, 1-(2'-sulphophenyl)-3-methyl-4-(3''-amino-4''-sulphophenylazo)-5-pyrazolone, 4-amino-4'-(3''-methyl-1''-phenyl-4''-pyrazol-5''-onylazo)-stilbene-2,2'-disulphonic acid, 4-amino-4'-(2''-hydroxy-3'',6''-disulpho-1''-naphthylazo)-stilbene-2,2'-disulphonic acid, 8-acetylamino-1-hydroxy-2-(3'-amino-4'-sulphophenylazo)-naphthalene-3,6-disulphonic acid, 7-(3'-sulphophenylamino)-1-hydroxy-2-(4'-amino-2'-carboxyphenylazo)-naphthalene-3-sulphonic acid, 8-phenylamino-1-hydroxy-2-(4'-amino-2'-sulphophenylazo)-naphthalene-3,6-disulphonic acid and 6-acetylamino 1-hydroxy-2-(5'-amino-2'-sulphophenylazo)-naphthalene-3-sulphonic acid.

In Class 4: 1-(3'-aminophenyl)-3-methyl-4-(2'',5''-disulphophenylazo)-5-pyrazolone, 1-(3'-aminophenyl)-3-carboxy-4-(2'-carboxy-4'-sulphophenylazo)-5-pyrazolone, 4-amino-4'-(3''-methyl-4''-(2''',5''''-disulphophenylazo)-1''-pyrazol-5''-onyl)stilbene-2,2'-disulphonic acid and 1-(3'-aminophenyl)-3-carboxy-4-(4''-(2''',5'''-disulphophenylazo)-2''-methoxy-5''-methylphenylazo)-5-pyrazolone.

In Class 5: the copper complex of 8-amino-1-hydroxy-2-(2'-hydroxy-5''-sulphophenylazo)-naphthalene-3,6-disulphonic acid, the copper complex of 6-amino-1-hydroxy-2-(2'-hydroxy-5'-sulphophenylazo)-naphthalene-3-sulphonic acid, the copper complex of 6-amino-1-hydroxy-2-(2'-hydroxy-5'-sulphophenylazo)-naphthalene-3,5-disulphonic acid, the copper complex of 8-amino-1-hydroxy-2-(2'-hydroxy-3'-chloro-5'-sulphophenylazo)-naphthalene-3,6-disulphonic acid, the copper complex of 6-(4'-amino-3'-sulphoanilino)-1-hydroxy-2-(2''-carboxyphenylazo)-naphthalene-3-sulphonic acid, the 1:2 chromium complex of 7-amino-6'-nitro-1,2'-dihydroxy-2,1'-azonaphthalene-3,4'-disulphonic acid, the 1:2 chromium complex of 6-amino-1-hydroxy-2-(2'-carboxyphenylazo)-naphthalene-3-sulphonic acid, the 1:2 chromium complex of 8-amino-1-hydroxy-2-(4'-nitro-2'-hydroxyphenylazo)-naphthalene-3,6-disulphonic acid, the 1:2 cobalt complex of 6-(4'-amino-3'-sulphoanilino)-1-hydroxy-2-(5''-chloro-2''-hydroxyphenylazo)-naphthalene-3-sulphonic acid, the 1:2 chromium complex of 1-(3'-amino-4'-sulphophenyl)-3-methyl-4-(2''-hydroxy-4''-sulpho-1''-naphthylazo)-5-pyrazolone, the 1:2 chromium complex of 7-(4'-sulphoanilino)-1-hydroxy-2-(4''-amino-2''-carboxyphenylazo)-naphthalene-3-sulphonic acid and the 1:2 chromium complex of 1-(3'-aminophenyl)-3-methyl-4-(4''-nitro-2''-carboxyphenylazo)-5-pyrazolone.

In Class 6: 1-amino-4-(3'-amino-4'-sulphoanilino)anthraquinone-2-sulphonic acid, 1-amino-4-(4'-amino-3'-sulphoanilino)-anthraquinone-2,5-disulphonic acid, 1-amino-4-(4'-(4''-amino-3'''-sulphophenyl)-anilino)-anthraquinone-2,5-disulphonic acid, 1-amino-4-(4'-(4''-amino-2''-sulphophenylazo)-anilino)-anthraquinone-2,5-disulphonic acid and 1-amino-4-(4'-methylamino-3-sulphoanilino)-anthraquinone-2-sulphonic acid.

In Class 7: 3-(3'-amino-4'-sulphophenyl)-suophamyl-copper-phthalocyanine-tri-3-sulphonic acid, di-4-(3'-amino- 4'-sulphophenyl)-sulphamyl-copper-phthalocyanine-di-4-sulphonic acid and 3-(3'-aminophenylsulphamyl)-sulphamyl-copper-phthalocyanine-di-3-sulphonic acid.

In Class 8: 4-amino-2'-nitro-diphenylamine-3,4'-disulphonic acid.

In Class 9: the copper complex of 2'-carboxy-2''-hydroxy-2''-amino-1,3,5triphenylformazane-4',5'',3'''-trisulphonic acid, the copper complex of 2',2''-dihydroxy-3'-amino-5'-methylsulphonyl-1,3,5-triphenyl-3'',5'',4''''-trisulphonic acid, the copper complex of 2'-carboxy-4'-amino-2''-hydroxy-1,3,5-triphenylformazane-3'',5'',2'''-trisulphonic acid, the copper complex of 2',2''-dicarboxy-4''-amino-1,3,5-triphenylformazane-4',4''-disulphonic acid, the copper complex of 2',2''-dihydroxy-5''-amino-1,5-diphenyl-3-methylformazane-5',3''-disulphonic acid, the copper complex of 2',2''-dihydroxy-5'-amino-1,3,5-triphenylformazane-3',3'',5''-trisulphonic acid, the copper complex of 2'-carboxy-3'-amino-2''-hydroxy-3'''(1''''-phenyl-3''''-methyl-pyrazol-5''''-onyl-4''''-azo)-1,3,5-triphenylformazane-3'',5'',2''',5''''-tetrasulphonic acid and the nickel complex of 2',2''-dicarboxyl-1,5-diphenyl-3-(m-aminobenzoyl)formazane-4',4''-disulphonic acid.

The new dyestuffs obtained according to the invention are valuable for dyeing natural and artificial textile materials, for example textile materials of cotton, regenerated cellulose, wool, silk, cellulose acetate, polyamides, polyacrylonitrile or modified polyacrylonitrile and for this purpose the dyestuffs can be applied to the textile material by dyeing, padding or printing, using printing pastes which contain the customary thickeners or oil-in-water emulsions or water-in-oil emulsions, whereby the textile materials are dyed in vivid shades having excellent fastness properties, especially fastness to wet treatments, such as washing, and fastness to light.

They are particularly valuable for dyeing cellulose textile materials. For this purpose, the dyestuffs are preferably applied to the cellulose textile material in conjunction with a treatment with an acid-binding agent, for example sodium carbonate, sodium metasilicate, trisodium phosphate or sodium hydroxide, which can be applied to the cellulose textile material before, during or after the treatment with the dyestuff. Instead, if the dyed textile material is subsequently to be warmed or steamed, a compound such as sodium bicarbonate or sodium trichloroacetate can be used, which on warming or steaming liberates an acid-binding agent.

The new dyestuffs can be applied to nitrogen-containing textile materials, such as wool and polyamide textile materials, from a weakly alkaline, neutral or acid dye bath. The dyeing process can be carried out at a constant or substantially constant pH value or, if desired, the pH value of the dye bath can be modified at any stage of the dyeing process by adding acids or acid salts or alkalis or alkaline salts.

The new dyestuffs can also be applied to textile materials, preferably cellulose textile materials, in conjunction with a resin-forming mixture and an acid catalyst, in which case, after the treatment, the textile material is, if desired, dried and thereafter heated to a temperature above 100° C, preferably between 130° and 170° C.

It is advisable to remove the non-fixed dyestuff as completely as possible after dyeing or printing. For this purpose, the dyeings and prints are thoroughly rinsed with warm and cold water and subjected to a soaping process in the presence of non-ionic dispersing agents and/or wetting agents.

In the examples which follow the parts, unless otherwise stated, denote parts by weight and the percentages denote percentages by weight.

EXAMPLE 1 a. (4,6-Dichloro-s-triazin-2-yl)-phosphorimidetrichloride:

16.5 Parts of thoroughly dried 4,6-dichloro-2-amino-s-triazine are slowly warmed with 20.8 parts of phosphorus pentachloride in 100 parts by volume of dioxane, whilst stirring vigorously. The reactants dissolve, with vigorous evolution of HCl. The reaction mixture is boiled overnight under reflux. Thereafter it is allowed to cool.

The solution of (4,6-dichloro-s-triazin-2-yl)phosphorimide-trichloride thus obtained is employed directly for the hydrolysis. The product can, however, also be obtained in a pure form by driving off the dioxane in vacuo and subsequent sublimation if appropriate.

Instead of 4,6-dichloro-2-amino-s-triazine, it is also possible to employ an equivalent amount of 4,6-dibromo- or 4,6-difluoro-2-amino-s-triazine.

b. (4,6-Dichloro-s-triazin-2-yl)-phosphoramide-acid

The solution of (2,6-dichloro-s-triazin-2-yl)-phosphorimide-trichloride in dioxane, obtained according to (a), is added dropwise, with vigorous stirring, to a solution of 20 parts of disodium hydrogen phosphate in 500 parts by volume of water at room temperature. The pH is kept at between 7 and 8 by simultaneous addition of about 500 parts by volume of 1 N NaOH solution.

The solution of the disodium salt of (4,6-dichloro-s-triazin-2-yl)-phosphoramide-acid thus obtained, is employed directly as an acylating agent for dyestuffs containing amino groups.

The corresponding 4,6-dibromo and 4,6-difluoro compounds can also be manufactured in the same manner by hydrolysis of (4,6-dibromo-s-triazin-2-yl)-phosphorimide-trichloride or (4,6-difluoro-s-triazin-2-yl)-phosphorimide-trichloride.

If instead of 4,6-dichloro-2-amino-s-triazine an equivalent amount of 4,6-dichloro-2-methylamino-s-triazine is employed and in other respects exactly the procedure described is followed, a solution of N-(4,6-dichloro-s-triazin-2-yl)-N-methyl-phosphoramide-acid is obtained, which can be employed directly as an acylating agent.

EXAMPLE 2

220 Parts by volume of a neutral aqueous solution containing 4.9 parts of (4,6-dichloro-s-triazin-2-yl)phosphoramide-acid are treated with 4 parts of anhydrous sodium acetate. A neutralised solution of 7.9 parts of 2-amino-8-hydroxy-1-(4'-amino-2'-sulphophenylazo)-naphthalene-6-sulphonic acid in 100 parts by volume of water is added, whilst stirring vigorously, and the whole is warmed to 40°–42° C.

After the amino group has been acylated, the dyestuff is salted out with sodium chloride, filtered off and dried in vacuo at 50°–60° C. The dyestuff thus obtained dyes cotton in bluish-tinged red shades.

Reaction of 1 equivalent of the dyestuffs, containing amino groups, listed in column I of the table below, with 1 equivalent of (4,6-dichloro-s-triazin-2-yl)phosphoramide-acid, yields dyestuffs which dye cotton in the shades indicated in column II.

| | I | II |
|---|---|---|
| 1 | 2-(4'-Amino-2'-methylphenylazo)-naphthalene-3,6,8-trisulphonic acid | Golden yellow |
| 2 | 1-(2',5'-Dichloro-4'-sulphophenyl)-3-methyl-4-(5"-amino-2"-sulphophenylazo)-5-pyrazolone | Greenish-tinged yellow |
| 3 | 1-Amino-4-(3'-amino-2',4',6'-trimethylanilino)-anthraquinone-2,5'-disulphonic acid | Reddish-tinged blue |
| 4 | 6-Amino-1-hydroxy-2-(2'-sulphophenylazo)-naphthalene-3-sulphonic acid | Orange |
| 5 | 8-Amino-1-hydroxy-2-(2'-sulphophenylazo)-naphthalene-3,6-disulphonic acid | Bluish-tinged red |
| 6 | 8-Acetylamino-1-hydroxy-2-(5'-amino-2'-sulphophenylazo)-naphthalene-3,6-disulphonic acid | Red |
| 7 | Copper complex compound from 8-amino-1-hydroxy-2-(1'-hydroxy-4',8'-disulphonaphthyl-[2'-azo]naphthalene-3,6-disulphonic acid | Blue |
| 8 | Copper complex compound from 8-amino-1-hydroxy-2-(2'-hydroxy-3'-chloro-5'-sulphophenylazo)-naphthalene-3,6-disulphonic acid | Violet |
| 9 | Copper complex from 2'-carboxy-4'-amino-2"-hydroxy-1,3,5-triphenyl-formazane-3",5",2'''-trisulphonic acid | Blue |
| 10 | 1:2 Chromium complex compound from 6-amino-1-hydroxy-2-(2'-carboxyphenylazo)-naphthalene-3-sulphonic acid | Brown |
| 11 | Mono-p-aminophenylamide of copper phthalocyanine-3,3',3",3'''- | Turquoise |

| I | II |
|---|---|
| tetrasulphonic acid | |

EXAMPLE 3

7.25 Parts of m-phenylenediamine-sulphonic acid are dissolved in 250 parts by volume of water at room temperature, with the aid of sodium hydroxide solution, to give a neutral solution, and 5 parts of anhydrous sodium acetate are added. A solution of 6.1 parts of (4,6-dichloro-s-triazin-2-yl)-phosphoramide-acid in 100 parts by volume of water is added to the resulting solution with vigorous stirring, and the mixture is left to react for approx. 24 hours. After clarification by filtration, the reaction product is separated out by adding 20 parts by volume of potassium chloride and dried in vacuo at 50° C.

7.9 parts of the amine thus obtained, of the formula

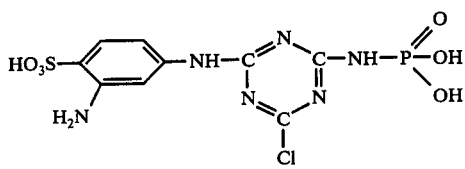

are dissolved in 200 parts of water and 10 parts of 2 N sodium nitrite solution and 5 parts of 10 N hydrochloric acid are added, whereupon the diazo compound precipitates partly as crystals.

The resulting suspension of the diazo compound is thereafter poured into a neutral solution of 8.5 parts of 1-hydroxy-8-benzoylamino-naphthalene-3,6-disulphonic acid in 50 parts of water, which additionally contains 10 parts of sodium bicarbonate. After completion of coupling, the dyestuff is salted out with sodium chloride, filtered off and dried in vacuo at 60° C.

The dyestuff thus obtained dyes cotton in bluish-tinged red shades.

If the diazo compound described above is combined with the coupling components of column I of the table which follows, dyestuffs which dye cotton in the shades indicated in column II are obtained.

| | I | II |
|---|---|---|
| 1 | 1-Ethyl-4-methyl-6-hydroxy-3-sulpho-methyl-pyridone-(2) | Strongly greenish-tinged yellow |
| 2 | Barbituric acid | Greenish-tinged yellow |
| 3 | 8-Acetylamino-1-hydroxynaphthalene-3,5-disulphonic acid | Red |
| 4 | Acetoacetanilide-4-sulphonic acid | Greenish-tinged yellow |

EXAMPLE 4

12.76 Parts of 1-hydroxy-8-amino-naphthalene-3,6-disulphonic acid are dissolved in 250 parts of water at room temperature, with the aid of sodium hydroxide solution, to give a clear solution, and 13.1 parts of anhydrous sodium acetate are added. A solution of 9.8 parts of (4,6-dichloro-s-triazin-2-yl)-phosphoramide-acid in 200 parts of water is added thereto, with vigorous stirring, and the reaction is allowed to proceed for approx. 24 hours.

Thereafter, the diazo compound manufactured in the usual manner from 6.92 parts of orthanilic acid is added to the clear solution of the reactive coupling component thus obtained.

After completion of coupling, the resulting dyestuff is precipitated with a mixture of sodium chloride and potassium chloride, filtered off and dried in vacuo at 50°-60° C.

The dyestuff thus obtained dyes cotton in bluish-tinged red shades.

The table which follows lists the colour shades of further dyestuffs which are synthesised from the diazo components and coupling components, also listed, of which latter components the amino group is linked to the reactive component analogously to the instructions in Example 4— or which are synthesised by reaction of the appropriate aminoazo dyestuffs with the reactive component—and which can be used for dyeing or printing cellulose materials according to one of the processes described.

| Diazo Component | Coupling Component | Colour Shade |
|---|---|---|
| 1-Aminobenzene-2-sulphonic acid | 1-Amino-8-hydroxynaphthalene-4,6-disulphonic acid | Red |
| " | 1-(3'-Aminobenzoylamino)-8-hydroxy-naphthalene-3,6-disulphonic acid | " |
| 1-Amino-2-carboxybenzene-4-sulphonic acid | 1-Amino-8-hydroxynaphthalene-3,6-disulphonic acid | " |
| 1-Amino-4-methylbenzene-2-sulphonic acid | " | " |
| 1-Amino-3-acetylaminobenzene-6-sulphonic acid | " | " |
| 1-Amino-3-(2'-[4"-sulphophenyl-amino]-4'-chloro-1',3',5'-triazin-6'-yl)-aminobenzene-6-sulphonic acid | " | " |
| 1-Amino-3-(2-40 -[4"'-sulphophenyl-amino]-4'-methylamino-triazin-1', 3',5'-yl-6')-aminobenzene-6-sulphonic acid | 2-Amino-5-hydroxynaphthalene-7-sulphonic acid | Orange |
| 1-Aminobenzene-2-sulphonic acid | 2-Methylamino-5-hydroxynaphthalene-7-sulphonic acid | " |
| 1-Amino-4-acetylamino-6-sulphonic acid | " | Scarlet |

EXAMPLE 5

28 Parts by volume of concentrated hydrochloric acid are added to a solution of 34.7 parts of sodium 2-aminonaphthalene-4,8-disulphonate and 7 parts of sodium nitrite in 300 parts of water, whilst cooling with ice, and the mixture is stirred for ½ hour at 0° to 10° C. After excess nitrous acid has been removed, 10.7 parts of 3-aminotoluene, dissolved in 10 parts by volume of concentrated hydrochloric acid and 150 parts of water, are added and the coupling is completed by buffering the mixture to $p_H$ 3 to 5. The resulting aminoazo dyestuff is salted-out, filtered off, washed and then redissolved in 700 parts of water, at $p_H$ 7, by adding sodium hydroxide solution. The aqueous solution is thereafter mixed with 25.5 parts of (4,6-dichloro-s-triazin-2-yl)-phosphoramide-acid as a neutral solution in 200 parts by volume of H$_2$O. The mixture is warmed to 40° C and the hydrochloric acid liberated is neutralised with sodium carbonate solution until a free amino group is no longer detectable. The resulting 4-chloro-6-(3'-methyl-4'-[4'',8''-disulphonaphthyl-2''-azo]phenylamino)-s-triazine-2-phosphoramide-acid is salted-out with 80 parts of sodium chloride, squeezed out, washed and dried in vacuo at 40° to 50° C. It is a yellow powder which dissolves in water to give a yellow colour.

EXAMPLE 6

A solution of 21 parts of the sodium salt of 1,4-diaminobenzene-6-sulphonic acid in 100 parts of water is stirred with a neutral solution of 24.5 parts of (4,6-dichloro-s-triazin-2-yl)-phosphoramide-acid in 200 parts by volume of H$_2$O at 20° to 40° C, whilst constantly neutralising the hydrochloric acid liberated to keep the $p_H$ at 6 to 7, until a sample, on diazotisation and coupling with 1-hydroxynaphthalene-4-sulphonic acid, gives a clear, yellowish-tinged red dyeing. After addition of ice, the resulting dyestuff intermediate product is directly diazotised with 7 parts of sodium nitrite and 28 parts of concentrated hydrochloric acid and subsequently combined with a previously prepared solution of 47 parts of the sodium salt of 1-benzoylamino-8-hydroxynaphthalene-3,6-disulphonic acid and 12 parts of sodium carbonate in 200 parts of water, whereupon coupling to give 4-chloro-6-(3'-sulpho-4'-[1'''-benzoylamino-2''-hydroxy-3'',6''-disulphonaphthyl-7''-azo]-phenylamino)-s-triazine-2-phosphoramide-acid takes place; the latter is salted-out, filtered off, washed and dried in vacuo at 40° to 50° C. The dyestuff readily dissolves in water to give a red colour and gives, by one of the processes described, clear bluish-tinged red dyeings and prints on cellulose materials.

The table which follows lists the colour shades and $p_H$-value of the coupling medium of dyestuffs which are manufactured analogously to the instructions in Example 6 from a diazo component which contains a further amino group which can preferably be acylated, from a coupling component and from a reactive component which can be linked to the diazo component. The processes mentioned can be employed for dyeing and printing cellulose materials with the dyestuffs in the table.

| Diazo Component | Coupling Component | $p_H$ of the Coupling Medium | Colour Shade |
| --- | --- | --- | --- |
| 1,3-Diaminobenzene-4-sulphonic acid | 2-Aminonaphthalene-5,7-disulphonic acid | 4 to 5 | Orange |
| " | 2-Aminonaphthalene-3,6-disulphonic acid | 4 to 5 | " |
| 1,3-Diaminobenzene-4-sulphonic acid | 1-(2',4'-Dichloro-1',3',5'-triazin-6'-yl-amino)-8-hydroxynaphthalene-3,6-disulphonic acid | 7 to 8 | Red |
| " | 1-(2',4'-Dihydroxy-1',3',5'-triazin-6'-yl-amino)-8-hydroxynaphthalene-3,6-disulphonic acid | 7 to 8 | " |
| " | 1-(2',4'-Dichloro-1',3',5'-triazin-6'-yl-amino)-8-hydroxynaphthalene-4,6-disulphonic acid | 7 to 8 | " |

EXAMPLE 7

If the instructions of Example 2 are followed but instead of 4,6-dichloro-s-triazin-2-yl)-phosphoramide-acid the corresponding amount of N-(4,6-dichloro-s-triazin-2-yl)-N-methyl-phosphoramide-acid is employed, a dyestuff is obtained which, when applied according to the customary methods, dyes cellulose materials in fast bluish-tinged red shades.

EXAMPLE 8

15 parts of 4,6-dichloro-s-triazin-2-yl-phosphorimide-trichloride, dissolved in 50 parts by volume of dioxane, are slowly run into a neutral solution of 27.2 parts of 2-(2'-ureido-4'-amino-phenylazo)-naphthalene-3,6,8-trisulphonic acid in 250 parts by volume of water, whilst stirring well. The $p_H$-value of the reaction mixture is kept at between 7 and 8 by adding 2 N sodium hydroxide solution. After completion of the addition, the product is salted-out with about 15% of sodium chloride, relative to the volume of the solution, and the 4-chloro-6-(3'-ureido-4'-[3'',6'',8''-trisulphonaphthyl-2''-azo]-phenylamino-s-triazin-2-yl)-phosphoramide-acid which has precipitated is filtered off and dried. This dyestuff gives golden yellow dyeings on cellulose material, using the dyeing processes mentioned later.

If the procedure indicated above is followed but instead of the aminoazo dyestuff employed therein equivalent amounts of the aminoazo dyestuff synthesised from the components listed in the table which follows are employed, valuable new reactive dyestuffs are again obtained.

In the table, the expression "saponified" means that an acylamino group contained in the aminoazo dyestuff has been saponified subsequently, whilst the term "reduced" indicates that a nitro group contained in the diazo component is reduced, after coupling, to give the amino group, resulting in the formation of the desired aminoazo dyestuff.

| Diazo Component | Azo Component | $p_H$ of the Coupling Medium | Colour Shade on Cellulose |
|---|---|---|---|
| 1-Amino-4-nitrobenzene-2-sulphonic acid | 1-(4'-Sulphophenyl)-3-methyl-pyrazolone-(5) | 5 to 6 | Yellow |
| (Nitro group in the 4-position subsequently reduced) | | | |
| 1-Amino-4-nitrobenzene-2-sulphonic acid | 1-(4'-Sulphophenyl)-3-carboxy-pyrazolone-(5) | 5 to 6 | Reddish-tinged yellow |
| " | 1-(3'-Sulphophenyl)-3-methyl-5-aminopyrazole | 6 to 7 | Yellow |
| 1-Amino-3-acetylamino-benzene-6-sulphonic acid | " | 6 to 7 | Yellow |
| (Acetylamino group in 3-position subsequently saponified) | | | |
| 1-Amino-2-methylbenzene-4,6-disulphonic acid | 2-Acetylamino-5-naphthol-7-sulphonic acid (saponified) | 7 to 8 | Orange |
| " | 2-Acetylamino-8-naphthol-6-sulphonic acid (saponified) | 7 to 8 | Red |
| 2-Aminonaphthalene-3,6-disulphonic acid | 1-Acetylamino-8-hydroxynaphthalene-3,6-disulphonic acid (saponified) | 7 to 8 | Bluish-tinged red |
| 2-Aminonaphthalene-3,7-disulphonic acid | 1-Acetylamino-8-hydroxynaphthalene-4,6-disulphonic acid (saponified) | 7 to 8 | Bluish-tinged red |
| 1-Amino-2,4-dimethyl-benzene-6-sulphonic acid | 2-Acetylamino-8-hydroxynaphthalene-3,6-disulphonic acid (saponified) | 7 to 8 | Red |
| 4-Aminoazobenzene-3,4'-disulphonic acid | 1-Amino-3-acetylamino-benzene | 5 to 6 | Yellow-brown |
| " | 1-Amino-2-(4'-amino-2'-sulphophenyl-[1']-azo)-8-hydroxy-naphthalene-3,6-disulphonic acid | 8 | Black |

EXAMPLE 9

66.3 Parts of the copper complex of 2-amino-6-(2',8'-dihydroxy-naphthylazo)-5-naphthol-4,8,3',6'-tetrasulphonic acid (manufactured according to the instructions of German Pat. No. 1,117,235 by coupling diazotised 1-amino-8-(benzenesulphonyloxy)-naphthalene-3,6-disulphonic acid with the equivalent amount of 2-acetylamino-5-hydroxynaphthalene-4,8-disulphonic acid in a medium rendered alkaline with sodium and carbonate, and converting the monoazo compound into the copper complex by oxidative coppering and hydrolysis of the acetyl and benzenesulphonyl group) are dissolved in 2,500 parts by volume of water at 60° to 65° C at $p_H$ 6 to 6.5 and 27 parts of (4,6-dichloro-s-triazin-2-yl)-phosphoramide-acid, dissolved in 250 parts by volume of water to give a neutral solution, are added at 10° to 20° C. During the condensation, a $p_H$ of 6 to 7 is maintained by adding sodium carbonate solution. After completion of the reaction, the dyestuff is salted-out and isolated. The dyestuff, when dried, is a dark powder which dissolves in water to give a blue colour and dyes cotton fabrics in very clear blue shades which are fast to wet processing.

EXAMPLE 10

96 Parts (expressed as 100% strength material) of freshly prepared copper phthalocyanine-tetrasulphochloride freshly prepared in the usual manner by the action of chlorosulphonic acid and thionyl chloride on copper phthalocyanine, or of the isomeric copper phthalocyanine-tetrasulphochloride synthesised from 1-sulphobenzene-3,4-dicarboxylic acid via the appropriate copper phthalocyanine-tetrasulphonic acid, are suspended, in the form of the moist, well washed cake from the suction filter, in 500 parts of water and 500 parts of ice, a solution of 50 parts of 1,3-diaminobenzene in 500 parts of water is added, and the $p_H$ is adjusted to 8.5 with sodium carbonate. The suspension is stirred for 24 hours at room temperature and in the course thereof the $p_H$ is constantly kept at 8.5 by continuous addition of sodium carbonate. The resulting condensation product is precipitated at $p_H$ 1 to 2 by addition of sodium chloride and is filtered off, washed and then again dissolved in 1,000 parts of water to give a neutral solution. A neutral solution of 85 parts of (4,6-dichloro-s-triazin-2-yl)-phosphoramide-acid in 400 parts of water is added to the blue solution and the mixture is stirred at 0° to 10° C, whilst constantly neutralising it with sodium carbonate solution to $p_H$ 6, until no further free amino groups are detectable. The reactive dyestuff thus obtained, of the formula

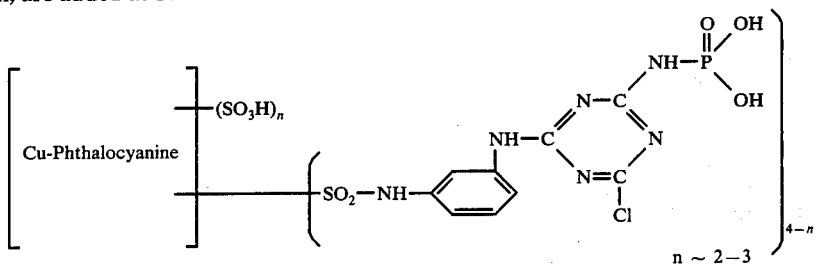

is salted-out, washed and dried in vacuo at 30° to 40° C. It is a dark blue powder which dissolves in water to give a blue colour, and dyes cotton and regenerated cellulose, according to one of the dyeing or printing processes indicated, in clear blue shades of good fastness to wet processing, rubbing and light.

Instead of 96 parts of copper phthalocyaninetetrasulphochloride it is also possible—whilst otherwise following the same procedure as in Example 10—to employ 87 parts (expressed as 100% strength material) of the copper or nickel phthalocyanine-trisulphochloride, obtainable by the action of chlorosulphonic acid on copper phthalocyanine or nickel phthalocyanine, in the form of the moist suction-filtration cake, which has been well washed with ice water; in these cases, reactive dyestuffs which give clear blue dyeings are again obtained.

If the procedure indicated in Example 10 is followed but 87 parts of copper phthalocyanine-trisulphochloride are used as starting material and instead of the 50 parts of the sodium salt of 1,3-diaminobenzene 90 parts of the sodium salt of 4,4'-diaminodiphenyl-2,2'-disulphonic acid or 90 parts of the sodium salt of 4,4'-diaminostilbenzene-2,2'-disulphonic acid are employed, reactive dyestuffs are obtained, which dye cellulose materials, according to one of the abovementioned processes, in clear blue shades which are fast to wet processing, rubbing and light.

If 4,',4'',4''',4''''-tetraphenyl-Cu-phthalocyanine is used as the starting material, sulphochlorination and reaction with 1,3-phenylenediamine and acylation with (2,4-dichloro-s-triazin-6-yl)-phosphoramide-acid yields a reactive dyestuff which dyes cellulose materials, in the presence of acid-binding agents, in clear green shades which are fast to wet processing and to light.

EXAMPLE 11

84.5 Parts of the copper complex of 2-(2'-methyl-4'-aminophenylazo)-6-(2'',8''-dihydroxy-naphthylazo)-5-naphthol-4,8,3'',6''-tetrasulphonic acid are dissolved in 3,000 parts by volume of water at $p_H$ 6 and combined, whilst stirring at a temperature of 20° to 30° C, with a neutral solution of 26 parts of (4,6-dichloro-s-triazin-2-yl)phosphoramide-acid in 250 parts of water, a $p_H$ of 6 being maintained by means of 2 N potassium carbonate solution. The mixture is stirred until the condensation is complete and the dyestuff is separated out by adding a little sodium chloride and is isolated. The residue is washed with acetone and dried at room temperature under reduced pressure. A dark powder is obtained, which dissolved in water to give a green colour and dyes cotton in green shades according to the procedures indicated.

EXAMPLE 12

52.4 Parts of the sodium salt of 4-([4''-aminophenyl]-amino)-2'-nitrodiphenylamine-3,4'-disulphonic acid are dissolved in 1,000 parts of water and stirred with 26 parts of (4,6-dichloro-s-triazin-2-yl)-phosphoramide-acid, as a neutral solution in 250 parts of water, for 1 hour at 0° to 10° C. At the same time the acid liberated is continuously neutralised with sodium carbonate to pH-value of 6 to 7. The reactive nitro dyestuff formed, of the formula

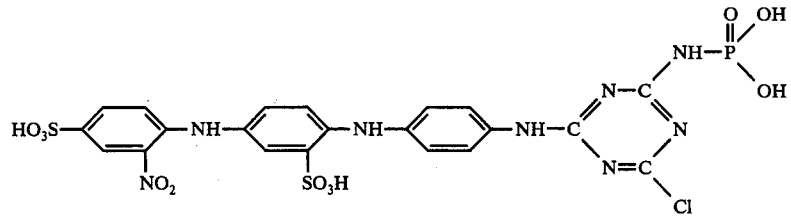

is salted-out, filtered off, washed and dried. It dyes cellulose fibres from a dilute liquor, or according to one of the customary padding processes, in the presence of sodium carbonate as an acid-binding agent, to give deep violet-brown shades which are fast to wet processing and to rubbing.

EXAMPLE 13

79.6 Parts of 1-amino-8-hydroxynaphthalene-3,6-disulphonic acid are dissolved in 500 parts of water and a suspension of the diazo salt of (2-chloro-4-(3'-amino-4'-sulpho-phenyl)-s-triazin-6-yl)-phosphoramide-acid (manufactured from 47 parts of 1,3-diamino-benzenesulphonic acid according to Example 3) is added thereto. The $p_H$ is adjusted to 3.0 with sodium acetate solution and after completion of coupling, and salting-out with sodium chloride, the crystalline reaction product is filtered off and washed with 10% strength sodium chloride solution. The dyestuff is dried in vacuo at 60° C.

EXAMPLE 14

38.6 Parts of the monoazo dyestuff from Example 13 are dissolved in 460 parts of water and 6.7 parts of sodium carbonate and the diazonium solution from 4.7 parts of aniline is added at 0° to 5° C whilst maintaining a $p_H$ of 8 to 8.5. The mixture is stirred for approx. 3 hours longer, the $p_H$ is adjusted to 5.5 with hydrochloric acid and the product is filtered off and washed with 5% strength sodium chloride solution. The dyestuff of the formula

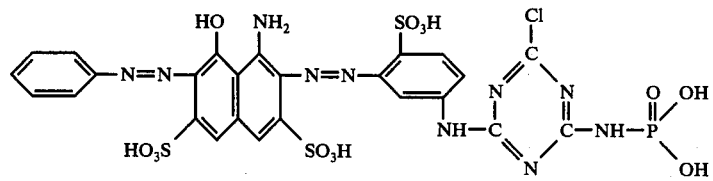

is dried in vacuo at 60° C and gives a black colour on cotton and rayon when used for dyeing at 8 to 10% strength.

If, in this example, the aniline is replaced by the diazo components indicated in the table which follows, in equivalent amount, valuable dyestuffs are again obtained, which dye cotton in the indicated colour shades.

| Diazo Component | Color Shade |
|---|---|
| 2-Aminobenzene-1-sulphonic acid | black |
| 2-Amino-5-chlorobenzene-1-sulphonic acid | '' |
| 2-Amino-5-methylbenzene-1-sulphonic acid | '' |
| 2-Amino-5-nitrobenzene-1-sulphonic acid | '' |
| 2-Aminonaphthalene-1-sulphonic acid | '' |
| Dihydro-p-toluidine-disulphonic acid | '' |
| 2-Aminonaphthalene-1,5-disulphonic acid | '' |

EXAMPLE 15

If the instructions of Example 4 are followed but instead of the (4,6-dichloro-s-triazin-2-yl)-phosphoramide-acid used therein the equivalent amount of N-(2,4- dichloro-s-triazin-6-yl)-N-methylphosphoramide-acid is employed, a dyestuff which dyes cotton in bluish-tinged red shades is again obtained.

EXAMPLE 16

If, following the instructions of Example 3, 1,3-phenylenediamine-4-sulphonic acid is reacted, instead of with (4,6-dichloro-s-triazin-2-yl)-phosphoramide-acid, with the equivalent amount of N-(2,4-dichloro-s-triazin-6-yl)-N-methyl-phosphoramide-acid and the resulting intermediate product is diazotised and coupled with 1-hydroxy-8-benzoylamino-naphthalene-3,6-disulphonic acid, a dyestuff which dyes cotton in bluish-tinged red shades is obtained.

EXAMPLE 17

8.2 Parts of the diazo compound, manufactured according to Example 3, of (2-chloro-4-(3'-amino-4'-sulpho-phenyl)-s-triazin-6-yl)-phosphoramide-acid, are coupled to 9.3 parts of 1-hydroxy-8-(2'-chloro-4'-methoxy-s-triazin-6'-yl)-aminonaphthalene-3,6-disulphonic acid at p$_H$ 6 to 7, according to the customary methods. The bis-reactive dyestuff of the formula room temperature by means of sodium hydroxide solution to give a clear solution, and 10 parts of anhydrous sodium acetate are added. A neutral solution of 8.8 parts of (4,6-dichloro-s-triazin-2-yl)-phosphoramide-acid in 200 parts by volume of water is added thereto, with vigorous stirring, and the mixture is left to react for approx. 24 hours. At the same time, 7.5 parts of m-phenylenediamine sulphonic acid are dissolved in 250 parts by volume of water at room temperature by means of sodium hydroxide solution, to give a neutral solution, and 10 parts of anhydrous solution acetate are added. A neutral solution of 9.8 parts of (4,6-dichloro-s-triazin-2-yl)-phosphoramide-acid in 200 parts by volume of water is added to the resulting solution, with vigorous stirring, and the reaction is allowed to proceed for approx. 24 hours. After clarifying by filtration, 20 parts of 2 N sodium nitrite solution and 10 parts of 10 N hydrochloric acid are added to the reaction product, whereupon the diazo compound precipitates partially as crystals. The resulting suspension of the diazo compound is thereafter poured into the solution of the coupling component, whilst keeping the p$_H$-value at between 6 and 7 by simultaneous addition of sodium hydroxide solution.

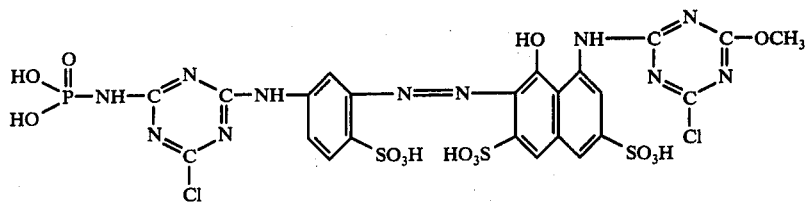

which is isolated by salting-out dyes cotton in red shades.

If instead of the coupling components mentioned in Example 17 those listed in the table which follows are used but in other respects exactly the same procedure as in this example is followed, bis-reactive dyestuffs are again obtained, which dye cotton, according to one of the processes indicated below, in the indicated colour shades, which have very good fastness properties.

After completion of coupling, the dyestuff is salted-out with sodium chloride, filtered off and dried in vacuo at 60° C. The bis-reactive dyestuff thus obtained dyes cotton in bluish-tinged red shades.

Bis-reactive dyestuffs can be synthesised, analogously to the instructions in Example 18, from the diazo components and coupling components listed in the table which follows, and these dyestuffs, for example when used to dye cellulose materials according to the dyeing

| Coupling Component | Shade |
|---|---|
| 2-Chloro-4-(8'-hydroxy-3',6'-disulphonaphthyl)-amino-6-(2''-sulphophenyl)-amino-s-triazine | red |
| 2-Chloro-4-(8'-hydroxy-4',6'-disulphonaphthyl)-amino-6-(2''-cyano-prop-2''-oxy)-s-triazine | " |
| 2,4-Dichloro-6-(8'-hydroxy-4',6'-disulphonaphthyl)-amino-s-triazine | " |
| 2-Chloro-4-amino-6-(8'-hydroxy-3',6'-disulphonaphthyl)-amino-s-triazine | " |
| 2-Chloro-4-(8'-hydroxy-4',6'-disulphonaphthyl)-amino-6-β-ethoxy-s-triazine | " |
| 2,4-Dichloro-5-N-(8'-hydroxy-4',6'-disulphonaphthyl)-carbonamido-pyrimidine | " |
| 2-Chloro-4-ureido-6-(8'-hydroxy-3',6'-disulphonaphthyl)-amino-s-triazine | " |
| 2-(2'-Methyl-4'-(2'',4''-dichloro-s-triazin-6''-yl)-amino-5'-sulpho-phenyl)-3-methyl-pyrazolone-5 | yellow |
| 2-(2'-Methyl-4'-(2''-chloro-4''-methoxy-s-triazin-6''-yl)-amino-5'-sulpho-phenyl)-3-methyl-pyrazolone-5 | " |
| 2-(2'-Methyl-4'-(2''-chloro-4''-(3'''-sulpho-phenyl)-s-triazin-6''-yl)-amino-5'-sulphophenyl)-3-methyl-pyrazolone-5 | " |
| 2-(2'-Sulpho-4'-(2''-chloro-4''-amino-s-triazin-6''-yl)-amino-phenyl-3-carboxy-pyrazolone-5 | " |

EXAMPLE 18

12.76 Parts of 1-hydroxy-8-aminonaphthalene-3,6-disulphonic acid are dissolved in 250 parts of water at processes indicated below, give dyeings in the colour shades indicated in the table.

| Diazo Component | Coupling Component | Shade |
|---|---|---|
| 2-Amino-4-(2'-chloro-4'-methoxy-s-triazin-6'-yl)-amino-benzenesulphonic acid | (2-Chloro-4-(8'-hydroxy-3',6'-disulphonaphthyl)-amino-s-triazin-6-yl)-phosphoramide-acid | red |
| 2-Amino-5-(2',4'-dichloro-s-triazin-6'yl)-amino- | (2-Chloro-4-(8'-hydroxy-4',6'-disulphonaphthyl)-amino-s-triazin-6-yl)-phosphoramide-acid | red |

-continued

| Diazo Component | Coupling Component | Shade |
|---|---|---|
| benzenesulphonic acid 2-Chloro-4-(3'-sulphophenyl)-amino-6-(3''-amino-4''-sulphophenyl)-amino-s-triazine | " | red |
| " | (2-Chloro-4-(2'-sulpho-3'-(3''-methyl-pyrazol-5-on-2-yl)-4'-methylphenyl)-amino-s-triazin-6-yl)-phosphoramide-acid | yellow |
| 2-Chloro-4-isopropoxy-6-(3'-amino-4'-sulphophenyl)-s-triazine | (2-Chloro-4-(8'-hydroxy-3',6'-disulphonaphthyl)-amino-s-triazin-6-yl-phosphoramide-acid | red |
| 2-Chloro-4-(β-ethoxy)-ethoxy-6-(3'-amino-4'-sulpho-phenyl-s-triazine | " | red |
| " | (2-Chloro-4-(4'-(3''-methyl-5-on-2-yl)-5'-sulpho-phenyl)-s-triazin-6-yl)-phosphoramide-acid | yellow |

EXAMPLE 19

9.76 Parts of 4-amino-4'-(4''-N-methylamino-phenylazo)-stilbene-2,2'-disulphonic acid are dissolved in 200 parts of water, the $p_H$-value is adjusted to 6.5 with 10 N sodium hydroxide solution and 100 parts of a neutral solution containing 5 parts of (4,6-dichloro-s-triazin-2-yl)-phosphoramide-acid are added. The $p_H$ is kept constant at 6.5 by simultaneous addition of 5 N sodium hydroxide solution. Towards the end of the reaction, the mixture is warmed to 30°–35° C. When no further free amino groups are detectable, the bis-reactive dyestuff formed is salted-out, filtered off and dried. A yellow powder, which dyes cotton in yellow shades of high fastness, is obtained.

EXAMPLE 20

The same dyestuff as in Example 19 is obtained if instead of the solution of (4.6-dichloro-s-triazin-2-yl)phosphoramide-acid in water an equivalent amount of (4,6-dichloro-s-triazin-2-yl)-phosphoramide-trichloride, dissolved in dioxane, is added.

EXAMPLE 21

If instead of (4,6-dichloro-s-triazin-6-yl)-phosphoramide-acid in Example 18, the equivalent amount of (N-4,6-dichloro-s-triazin-6-yl)-N-methyl-phosphoramide-acid is used, a red, bis-reactive dyestuff is again obtained.

Dyeing Instruction I

2 Parts of dyestuff are dissolved in 100 parts of water, with addition of 0.5 part of sodium m-nitrobenzenesulphonate. A cotton fabric is impregnated with the resulting solution so that its weight increased by 75%, and is then dried.

Thereafter the fabric is impregnated with a solution at 20° C which contains, per liter, 5 grams of sodium hydroxide and 300 grams of sodium chloride, and is squeezed out to 75% weight increase, and the dyeing is steamed for 60 seconds at 100° to 101° C, rinsed, soaped for quarter of an hour in an 0.3% strength boiling solution of a non-ionic detergent, rinsed and dried.

Dyeing Instruction II

2 Parts of dyestuff are dissolved in 100 parts of water.

The solution is added to 3,900 parts of cold water, 80 parts of sodium chloride are added and 100 parts of a cotton fabric are introduced into this dyebath.

The temperature is raised to 90° C over the course of 45 minutes, with 40 parts of trisodium phosphate and a further 80 parts of sodium chloride being added after 30 minutes. The temperature is kept at 90° C for 30 minutes and the dyeing is rinsed and soaped for 15 minutes in an 0.3% strength boiling solution of a non-ionic detergent, rinsed and dried.

Printing Instruction

2 Parts of dyestuff are sprinkled, with rapid stirring, into 100 parts of a stock thickener containing 45 parts of 5% strength sodium alginate thickener, 32 parts of water, 20 parts of urea, 1 part of sodium m-nitrobenzenesulphonate and 2 parts of sodium bicarbonate.

A cotton fabric is printed on a roller printing machine with the printing paste thus obtained and the resulting printed fabric is steamed for 4 minutes at 100° C in saturated steam. The printed fabric is then thoroughly rinsed in cold and hot water, during which components which have not been fixed chemically are very easily removable from the fibres, and is subsequently dried.

What I claim is:

1. A reactive dyestuff of the formula

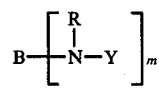

wherein
B ia an azo dyestuff radical;
R is hydrogen, lower alkyl or lower alkyl substituted by methoxy, ethoxy or hydroxy;
$m$ is 1–2 and
Y is

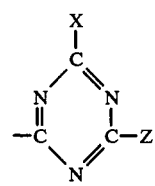

where
X is chloro, bromo, or fluoro;
Z is

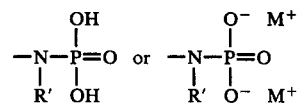

where each M+ is alkali metal or ammonium or both M+ together represent magnesium, calcium or zinc; and R' is hydrogen, lower alkyl or lower alkyl substituted by methoxy, ethoxy or hydroxy.

2. A dyestuff according to claim 1 wherein B is of the formula

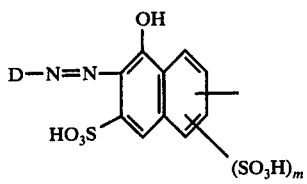

wherein

D is sulphophenyl, sulphonaphthyl or sulphophenyl further substituted by halo, lower alkyl, lower alkylcarbonylamino, lower alkoxycarbonylamino, ureido or lower alkoxy;

$(SO_3H)_m$ represents a sulpho group in the 5- or 6-position when present and $m$ is 0 or 1.

3. A dyestuff according to claim 1 wherein B is of the formula

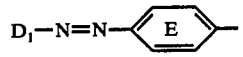

where $D_1$ is sulfophenyl, sulfonaphthyl, stilbenyl or sulfophenyl further substituted by halo, lower alkyl, lower alkylcarbonylamino, lower alkoxycarbonylamino, lower alkoxy or ureido; and the benzene ring E is unsubstituted or substituted by halo, lower alkyl, lower alkoxy, lower alkylcarbonylamino, lower alkoxycarbonylamino or ureido.

* * * * *